United States Patent [19]

Takeda et al.

[11] 4,229,258
[45] Oct. 21, 1980

[54] FUEL ASSEMBLY

[75] Inventors: Renzo Takeda, Yokohama; Sadao Uchikawa, Kawasaki; Kunitoshi Kurihara, Sagamihara; Masaaki Yamamoto, Kokubunji; Michiro Yokomi, Ibaraki; Junichi Yamashita; Jun Takamatsu, both of Hitachi, all of Japan

[73] Assignee: Hitachi, Ltd., Japan

[21] Appl. No.: 835,962

[22] Filed: Sep. 23, 1977

[30] Foreign Application Priority Data

Sep. 25, 1976 [JP] Japan .................................. 51/115269

[51] Int. Cl.² ............................................... G21C 3/02
[52] U.S. Cl. ........................................ 176/76; 176/78
[58] Field of Search ................... 176/17, 18, 30, 36 R, 176/76, 78, 73, 74, 84, 52, 54

[56] References Cited

U.S. PATENT DOCUMENTS

| | | | |
|---|---|---|---|
| 3,166,481 | 1/1965 | Braun | 176/78 |
| 3,275,525 | 9/1966 | Bloomster et al. | 176/68 X |
| 3,745,069 | 7/1973 | Sofer et al. | 176/76 X |
| 3,799,839 | 3/1974 | Fisher et al. | 176/18 X |
| 3,986,924 | 10/1976 | Motoda | 176/17 |
| 4,040,902 | 8/1977 | Mysels | 176/84 X |

FOREIGN PATENT DOCUMENTS

| | | | |
|---|---|---|---|
| 49-78296 | 10/1974 | Japan | 176/74 |
| 1126322 | 9/1968 | United Kingdom | 176/30 |

OTHER PUBLICATIONS

Barth et al., *Power-Flattening Techniques,* Nucleonics, May, 1965, pp. 72–73.
McFarlane, *Physics of Operating Pressurized Water Reactors,* Nuc. Applications & Tech., vol. 9, Nov. 1970, pp. 634–639.

*Primary Examiner*—Peter A. Nelson
*Attorney, Agent, or Firm*—Craig & Antonelli

[57] ABSTRACT

A fuel assembly suitable for use in boiling water reactor. The fuel assembly has a specific pattern of distribution of enrichment, so that the upper region of the assembly has a larger infinite multiplication factor than that of the lower region. In an example, the distribution of enrichment is such that the upper region has a mean enrichment larger than that of the lower region, while, in another example, the mean enrichment is maintained constant over the length of the assembly but the difference of enrichments between the central and peripheral portions of a plane normal to the axis of the assembly is made smaller at the upper region than at the lower region.

31 Claims, 7 Drawing Figures

*FIG. 6*

| 35 | 34 | 34 | 33 | 33 | 33 | 34 | 35 |
|---|---|---|---|---|---|---|---|
| 34 | 33 | 32 | 32 | 31 | 31 | 33 | 34 |
| 34 | 32 | 31 | 31 | 31 | 36 | 31 | 33 |
| 33 | 32 | 31 | 31 | 15 | 31 | 31 | 33 |
| 33 | 31 | 31 | 15 | 31 | 31 | 32 | 33 |
| 33 | 31 | 36 | 31 | 31 | 31 | 32 | 34 |
| 34 | 33 | 31 | 31 | 32 | 32 | 33 | 34 |
| 35 | 34 | 33 | 33 | 33 | 34 | 34 | 35 |

*FIG. 7*

| 45 | 44 | 43 | 43 | 43 | 43 | 44 | 45 |
|---|---|---|---|---|---|---|---|
| 44 | 43 | 42 | 41 | 41 | 41 | 43 | 44 |
| 43 | 42 | 41 | 41 | 41 | 46 | 41 | 43 |
| 43 | 41 | 41 | 46 | 15 | 41 | 41 | 43 |
| 43 | 41 | 41 | 15 | 41 | 41 | 41 | 43 |
| 43 | 41 | 46 | 41 | 41 | 41 | 42 | 43 |
| 44 | 43 | 41 | 41 | 41 | 42 | 43 | 44 |
| 45 | 44 | 43 | 43 | 43 | 43 | 44 | 45 |

FUEL ASSEMBLY

LIST OF PRIOR ART REFERENCES (37 CFR 1.56 (a))

The following references are cited to show the state of the art:

Japanese Pat. Appln. Kokai (Laid-Open) No. 30790/74 Mar. 19, 1974

Japanese Pat. Appln. Kokai (Laid-Open) No. 78092/74 July 27, 1974

Japanese Pat. Appln. Kokai (Laid-Open) No. 81796/74 Aug. 7, 1974

Japanese Pat. Kokoku (Post-Exam Publn.) No. 12793/76 Apr. 22, 1976

BACKGROUND OF THE INVENTION

The present invention relates to a fuel assembly adapted for use in nuclear reactors.

In boiling water reactors, skewing of power distribution is caused due to uneven void distribution in the axial direction of the reactor.

More specifically, while the bottom of the reactor core at which the inlet for the coolant is located is kept in subcooling of about 10 kcal/kg, boiling and saturated boiling take place at the medium and upper portions of the core. Thus, the void fraction is increased as it goes upward, and reaches 70% or so at the top of the reactor core where the outlet for the coolant is provided. Consequently, the neutron thermalization is more remarkable at the bottom portion than at the top portion of the reactor core, to cause a skewed pattern of power distribution, so as to locate the point of the power peak at a lower position of the reactor core, typically at $\frac{1}{4}$ of the whole core height as measured from the bottom of the latter. In addition, the peak itself is steeper and high, as compared with that observed in other types of reactors.

To cope with this problem, there have been proposed a variety of solutions. According to one of these conventional measures, specific control rods generally referred to as "shallow rods" are inserted to the core at a portion of the latter $\frac{1}{4}$ of the entire core height from the bottom, where the power peak is formed.

In another solution, fuel rods provided with gadolinea ($Gd_2O_3$) at their portions corresponding to the position of the power peak are used.

In the power distribution control by means of the shallow rods, the power peaking is formed around the ends of these rods, so that the fuel rods have to experience an abrupt change of power when the control rods are withdrawn. The shallow rods are often used in combination with so-called deep rods adapted to control the radial power distribution and reactivity of the reactor core. In such a case it is necessary to calculate various patterns of positions of the control rods, for flattening the axial and radial power distribution of the reactor, which is extremely difficult and troublesome.

In case of the gadolinea-containing fuel rods, the power distribution is largely affected by the position of the gadolinea. Thus, a slight design error of the fuel rod often renders the control of the power distribution difficult, and the power distribution is largely changed in accordance with the change of exposure.

For the reasons as stated above, these conventional measures have been ineffective for practical control of the nuclear reactor of the kind described.

SUMMARY OF THE INVENTION

It is therefore an object of the invention to overcome above stated problems of the prior arts by providing an improved fuel assembly for nuclear reactors, which can exhibit a power distribution which is so flat in the axial direction of the reactor core that the power distribution can be controlled solely by deep rods, without the aid of shallow rods.

To this end, according to the invention, there is provided a fuel assembly which is divided in the axial direction into two regions, i.e. upper and lower regions. These regions are made to have different infinite multiplication factors. More specifically, the upper region of the fuel assembly exhibits a higher infinite multiplication factor than the lower region, under same temperature and void fraction, so that the skewing of the power distribution due to the axially uneven void distribution is avoided, thereby to present a relatively flat pattern of power distribution.

The difference of the infinite multiplication factors can be afforded by either one or combination of the following three methods.

The first method relies upon the axial distribution of enrichment of the fuel assembly. Namely, the fuel assembly is so constructed as to have different mean enrichments in planes normal to the axis thereof, at the upper and the lower regions. The term "enrichment" is used in this specification and claims to denote at least either one of enrichment of uranium and enhancement of plutonium.

The second way relies upon the radial distribution of enrichment, rather than the mean enrichment.

More specifically, the fuel assembly is so constructed that the upper region thereof has different radial enrichment distribution from that of the lower region, although the mean enrichment in planes normal to the axis of the assembly is kept almost constant over the entire length of the assembly.

Generally speaking, the pattern of enrichment distribution across the section of the fuel assembly is such that the enrichment is relatively high at the central portion than at peripheral portion. This is made so in order to prevent occurance of an excessively large local power peak at the peripheral portion of the assembly, which is caused due to the neutron thermalization caused at that portion by ambient gap water of almost saturated temperature.

As a matter of practice, the fuel assembly is so designed to put the peak of power at its peripheral portion, maintaining the level of the peripheral local power peaking within an allowable range, because the neutron importance is higher at the peripheral portion than at the central portion. Thus, it is possible to shift the position of the power peak to the central portion by further enlarging the difference of enrichments between the central and peripheral portions of the assembly, so that the infinite multiplication factor is somewhat lowered without changing the mean enrichment across the cross-sectional plane of the assembly. It will be seen that the fuel assembly having portions of different infinite multiplication factors can be fabricated by adopting the described pattern of radial enrichment distribution for the lower region, while the upper region has the radial enrichment distribution similar to that of conventional assembly for allowing a slight peripheral local power peaking.

The third way is to incorporate fuel rods containing burnable poison. It is possible to obtain a higher infinite multiplication factor at the upper region than at the lower region of the assembly by enriching the burnable poison at the lower region rather than at the upper region. Gadolinea can advantageously be used as the burnable poison.

These three ways can be used solely or in combination for the described purpose.

The boundary of the upper and lower regions having different infinite multiplication factors is preferably located within a range of ⅓ to 7/12 of the whole height of the fuel assembly, as measured from the lower end of the latter, since such a height effectively flattens the pattern of the axial power distribution.

The above and other objects, as well as advantageous features of the invention will become more clear from the following description taken in conjunction with the attached drawings.

BRIEF EXPLANATION OF THE DRAWINGS

FIG. 6 is a schematic horizontal sectional view of another embodiment of the invention, showing the arrangement of fuel rods, and FIG. 7 is a schematic horizontal sectional view of still another embodiment of the invention, showing the arrangement of fuel rods.

DESCRIPTION OF THE PREFERRED EMBODIMENTS

Before turning to the description of the preferred embodiments, an explanation will be made hereinunder as to the power distribution characteristic of conventional reactor core, for clarifying the drawback of the prior arts.

Figure 1:
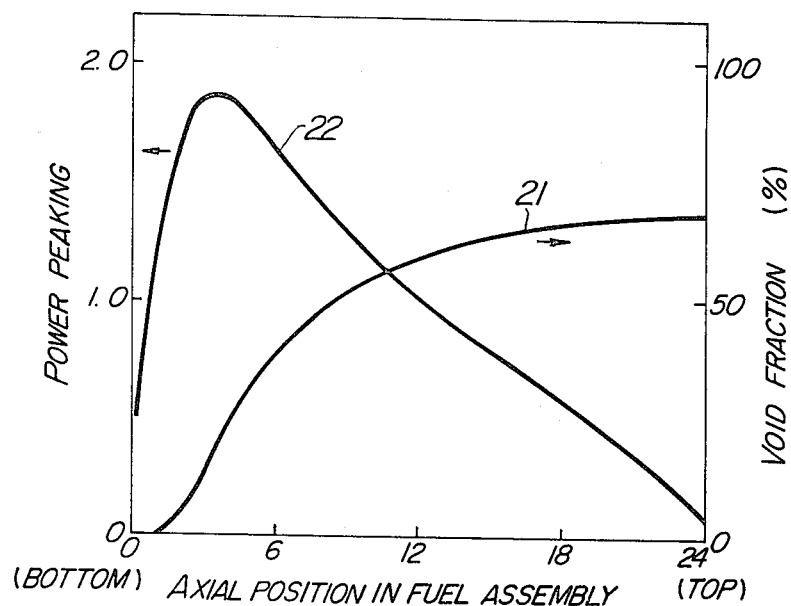
FIG. 1 shows an axial void distribution and a power distribution observed in a reactor core of a boiling water reactor employing conventional fuel assembly having a constant infinite multiplication factor over its length, in a state in which control rods are fully withdrawn.

FIG. 1 shows a power distribution characteristic of a reactor core having fuel assembly which has uniform axial distribution of infinite multiplication factor.

Axial distributions of the void and the axial distribution of the power are shown by curves 21 and 22, respectively. As will be seen from these curves, the void fraction increases as it gets toward the top of the reactor core, while the peak of the power is skewed to the lower portion of the core due to the axially uneven distribution of the void fraction. More specifically, the peak of the power is built at the portion of the reactor core about ¼ of the whole height of the core as measured from the bottom of the core. The peak is more steep and high as compared with those experienced in other types of nuclear reactor.

Figure 2:
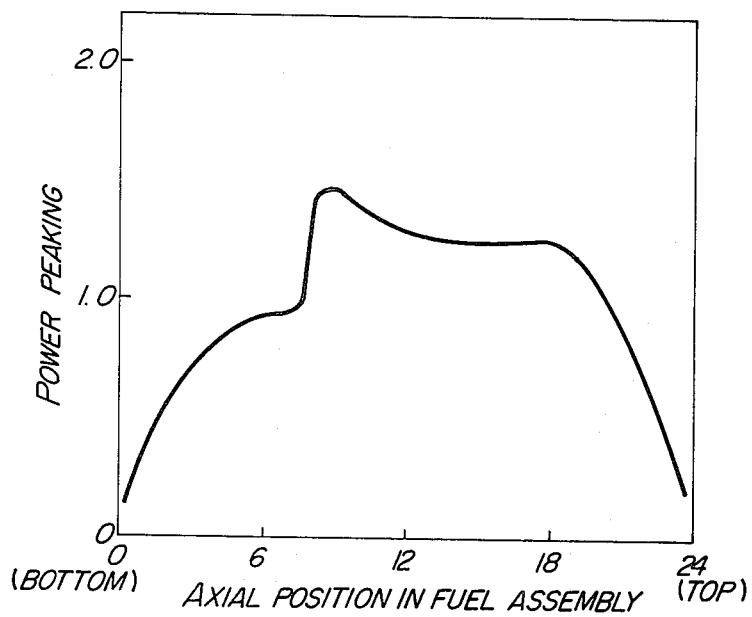
FIG. 2 shows an axial power distribution of a fuel assembly in the vicinity of the control rods which are inserted from the bottom of the reactor core having void and power characteristics as shown in FIG. 1.
Figure 3:
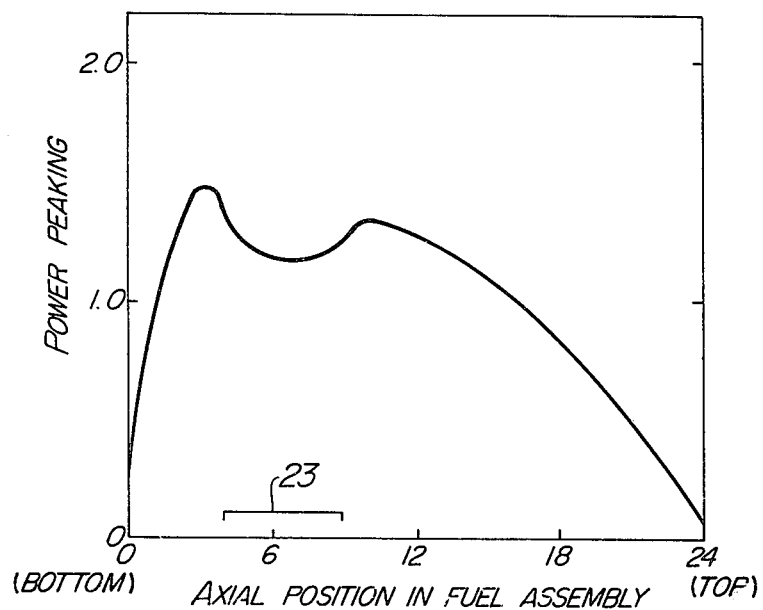
FIG. 3 shows a power distribution when a plurality of fuel rods provided at their portions corresponding to the position of power peak with gadolinea are used.

The power distribution curve can be changed as shown in FIG. 2, by inserting control rods to the portion of the core at which the peak of power appears, i.e. at the portion ¼ of the whole height as measured from the bottom of the core. FIG. 3 shows a power distribution curve modified by an adoption of fuel rods containing a predetermined amount of gadolinea. The axial distribution of the gadolinea is shown at a horizontal line 23.

Although the conventional measures can modify the axial power distribution to negate the peak of power to certain extents, they have been found unsatisfactory, because of the shortcomings as stated before.

However, the fuel assembly of the invention is entirely free from these problems, as will be seen from the following description of the preferred embodiments.

EMBODIMENT 1

In this embodiment, the upper region of the fuel assembly is made to have a large infinite multiplication factor than the lower region, by a combination of the aforementioned first way in which the upper region and the lower region have different mean enrichments across planes perpendicular to the axis of the assembly and the second way in which the upper and the lower regions have different patterns of enrichment distribution across planes perpendicular to the axis of the assembly.

Figure 4:
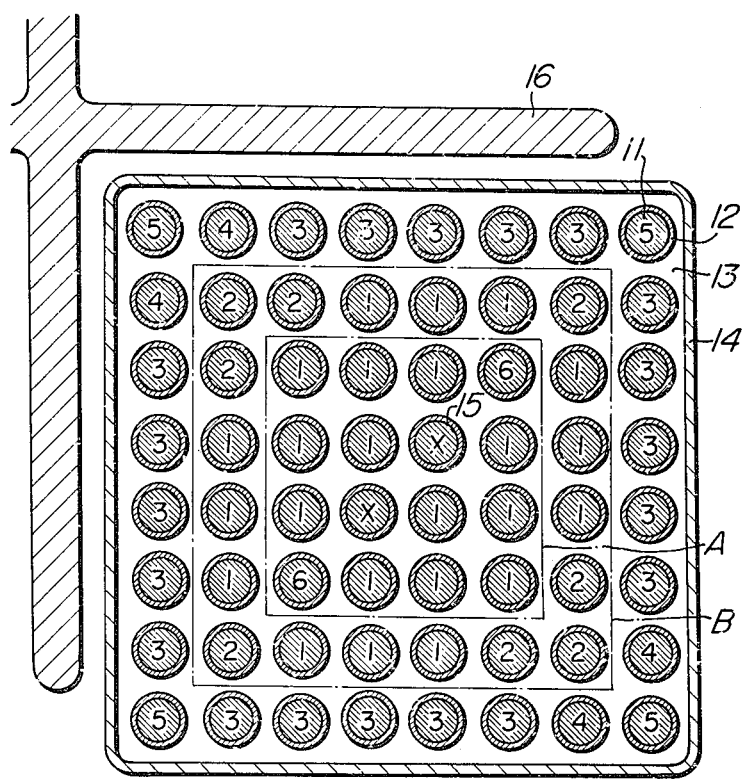
FIG. 4 is a horizontal sectional view of a fuel assembly which is a preferred embodiment of the invention.

FIG. 4 shows a cross-section of 8×8 fuel assembly which constitutes the described first embodiment. In FIG. 4, numeral 11 designates fuel pellets, 12 designates clad tubes, 13 designates coolant regions, 14 denotes a channel box, 15 denotes a water rod and 16 denotes a control rod. The fuel rods bear respective numbers such as 1, 2, 3, 4, 5 and 6, and have respective enrichments as shown in the following table 1.

TABLE 1

| Nos. of Fuel Rods | | 1 | 2 | 3 | 4 | 5 | 6 |
|---|---|---|---|---|---|---|---|
| Enrichments | Upper Region (Above the point 11/24 of rod from bottom) | | | 2.0 | | 1.5 | |
| | | 2.5 | 2.0 | | 1.5 | | 1.5 + 5% by weight of $Gd_2O_3$ |
| | Lower Region (Below the point 11/24 of rod from bottom) | | | 1.5 | | 1.3 | |
| Numbers of Fuel Rods per Assembly | | 24 | 8 | 20 | 4 | 4 | 2 |

(Unit of Enrichment: % by weight)

The fuel rods 1, 2, 4 and 6 have constant enrichments over their length. The fuel rods denoted at 1 have an enrichment of 2.5% by weight, the fuel rods 2 have an enrichment of 2.0% by weight, the fuel rods 4 have an enrichment of 1.5% by weight and fuel rods designated at 6 have an enrichment of 1.5% by weight with an addition of 5% by weight of gadolinea, respectively.

The fuel rods designated at 3 and 5 are divided into an upper and a lower regions, respectively.

The boundary is located, in each case of the fuel rods 3 and 5, at a height between 11th and 12th sections, assuming that they are axially divided into 24 sections. The upper and the lower regions have different enrichments, in both of the fuel rods 3 and 5. Namely, in the fuel rod designated at 3, the upper region has an enrichment of 2.0% by weight, while the lower region has an enrichment of 1.5% by weight. Similarly, in the fuel rod designated at 5, the upper and the lower regions have enrichments of 1.5% by weight and 1.3% by weight, respectively.

The fuel assembly constituted by fuel rods of Table 1 disposed in the manner as shown in FIG. 4 exhibits an enrichment distribution as shown in the following Table 2.

TABLE 2

|  | Mean Enrichment | Enrichment Distribution Across Cross-Section | | |
|---|---|---|---|---|
|  |  | Central Portion | Peripheral Portion | Difference |
| Upper Region | 2.11 | 2.31 | 1.81 | 0.45 |
| Lower Region | 1.94 | 2.31 | 1.47 | 0.84 |
| Difference | 0.17 |  |  |  |

(Unit of Enrichment: % by weight)

In Table 2, the "central portion" denotes the part of the fuel assembly enclosed by the square A of one-dot-and-dash line, while the "peripheral portion" means the part of the fuel assembly outside of a square B of one-dot-and-dash line in FIG. 4.

The infinite multiplication factors of the upper and lower regions of the fuel assembly having the enrichment distribution as shown in Table 2 and the void fraction of coolant of 40% are 1.126 and 1.092, respectively, and the infinite multiplication factor of the upper region is larger than that of the lower region by 3.4%, provided that the temperature and the void fraction are equal for both regions.

Figure 5:
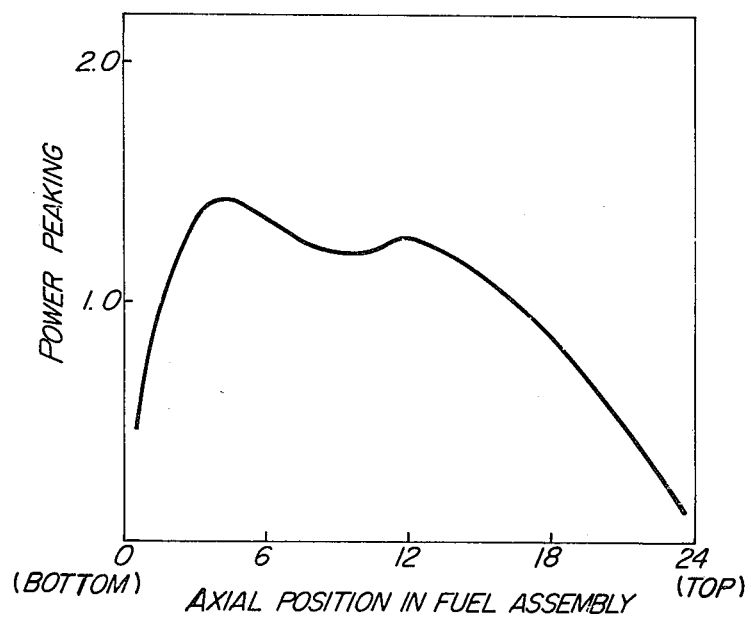
FIG. 5 shows the axial power distribution in the embodiment as shown in FIG. 4.

Thus, when a boiling water reactor is loaded with this fuel assembly, the differential of the infinite multiplication factors between the upper and the lower regions are negated by the differential of the void fraction of the coolant, so that the axial distribution of the power is rendered relatively uniform. The flattened pattern of axial power distribution afforded by the above negation is shown in FIG. 5. It will be seen that the power peaking is maintained as low as about 1.4. This means that the reactor can be controlled with a power peaking which is as small as that obtained by conventional controlling method, without using specific shallow rods or specific pattern of gadolinea distribution, solely by the deep control rods.

In the described embodiment, the boundary between the upper and the lower regions are located at a portion of the fuel assembly 11/24 of the whole height thereof from the bottom. However, this is not exclusive and the boundary may be located at other heights. However, for obtaining a good result, the boundary is preferably located within a range between ⅓ and 7/12 of the whole height, as measured from the bottom.

EMBODIMENT 2

FIG. 6 shows an arrangement of fuel rods constituting one fuel assembly which is another embodiment of the invention. There are 6 (six) kinds of fuel rods as denoted by numerals 31 to 36, respectively. These fuel rods have enrichments as shown in Table 3, while the numeral 15 in FIG. 6 denotes water rods.

TABLE 3

| Nos. of Fuel Rods | | 31 | 32 | 33 | 34 | 35 | 36 |
|---|---|---|---|---|---|---|---|
| Enrichment of Uranium (% by weight) | Upper Region (Above the point 11/24 of rod from bottom) |  | 2.5 | 2.1 | 1.7 |  | 1.7 + 5.0% by weight of Gd$_2$O$_3$ |
|  |  | 2.5 |  |  |  | 1.4 |  |
|  | Lower Region (Below the point 11/24 of Rod |  | 2.1 | 1.7 | 1.4 |  |  |

TABLE 3-continued

| Nos. of Fuel Rods | 31 | 32 | 33 | 34 | 35 | 36 |
|---|---|---|---|---|---|---|
| from bottom) Number of Fuel Rods per Assembly | 20 | 8 | 16 | 12 | 4 | 2 |

(Unit of Enrichment: % by weight)

The fuel rods denoted by 31 and 35 have a uniform structure over their length, while the fuel rods designated at 32, 33 and 34 are divided into upper and lower regions at portions 11/24 of whole height as measured from their bottoms, respectively.

The following Table 4 shows the enrichment distribution of the fuel assembly having fuel rods disposed in the manner as shown in FIG. 6.

TABLE 4

|  | Mean Enrichment | Enrichment Distribution Across Cross-Section | | |
|---|---|---|---|---|
|  |  | Central Portion | Peripheral Portion | Difference |
| Upper Region | 2.15 | 2.39 | 1.83 | 0.56 |
| Lower Region | 1.93 | 2.39 | 1.53 | 0.86 |
| Difference | 0.22 |  |  |  |

(Unit of Enrichment: % by weight)

As will be seen from Table 4 above, the mean enrichment is made larger at the upper region than at the lower region, as is the case of the foregoing embodiment. In addition, the differential of the enrichment across the cross-sectional plane is made smaller at the upper region than at the lower region. Due to the enrichment distribution as shown in Table 4, the fuel assembly exhibits a differential of the infinite multiplication factors between the upper and the lower regions, which well compares the differential of the infinite multiplication factors as observed in the fuel assembly of the first embodiment. Thus, the fuel assembly of this second embodiment has an axial power distribution which is similar to that of the first embodiment.

The assembly of this second embodiment is superior to that of the first embodiment in that the inspection at the fabrication is relatively easy, due to the relatively large enrichment differential within each fuel rod, and that the local power peaking is advantageously as small as 1.12. The boundary between the upper and the lower regions is preferably located within a range of between ⅓ and 7/12 of the whole height as measured from the bottom of the fuel assembly, as is the case of the first embodiment.

EMBODIMENT 3

The fuel assembly of the third embodiment has different infinite multiplication factors at the upper and the lower regions, which is caused by an adoption of the aforementioned second way, in which the upper and the lower region have different radial enrichment distribution across planes normal to the axis of the assembly, but the mean enrichment is common to both regions.

In the fuel assembly of the third embodiment, fuel rods as shown in the following Table 5 are arranged in a manner as shown in FIG. 7.

TABLE 5

| Fuel Rod Nos. | | 41 | 42 | 43 | 44 | 45 | 46 |
|---|---|---|---|---|---|---|---|
| Enrich- | Upper Region (Above the point 11/24 of rod from bottom) | 2.7 | 2.4 | 2.4 | 2.0 | 1.6 | 1.6 + 5% by weight of Gd$_2$O$_3$ |

TABLE 5-continued

| Fuel Rod Nos. | 41 | 42 | 43 | 44 | 45 | 46 |
|---|---|---|---|---|---|---|
| ment of Uranium Lower Region (Below the point 11/24 of rod from bottom) | 3.3 | 3.0 | 1.8 | 1.5 | 1.2 | 1.2 + 5% by weight of $Gd_2O_3$ |
| Number of Fuel Rods per Assembly | 23 | 4 | 20 | 8 | 4 | 3 |

(Unit of Enrichment: % by weight)

The fuel rods 41 to 46 are all divided into upper and lower regions at their portions 11/24 of the whole height as measured from the bottom of the fuel assembly. These regions have different enrichments.

The enrichment distribution of the fuel assembly is as shown in the following Table 6.

TABLE 6

| | Mean Enrichment | Enrichment Distribution Across cross-section | | |
|---|---|---|---|---|
| | | Central Portion | Peripheral Portion | Difference |
| Upper Region | 2.37 | 2.46 | 2.17 | 0.29 |
| Lower Region | 2.33 | 2.85 | 1.63 | 1.22 |
| Difference | 0.04 | | | |

(Unit of Enrichment: % by weight)

In the fuel assembly of the third embodiment, the upper and the lower regions have mean enrichments of 2.37% by weight and 2.33% by weight, respectively, and the difference is negligibly small. However, the upper and the lower regions have quite different radial enrichments, i.e. enrichments across planes normal to the axis of the assembly. Namely, the difference of the enrichments between the central and peripheral portions is relatively small at the upper region, as compared with the lower region, and the enrichment of the peripheral portion is considerably larger at the upper region than at the lower region.

Since the neutron importance is higher at the peripheral portion than at the central portion, the infinite multiplication factor at the upper region is higher than that of the lower region by about 2.2%, although the mean enrichment across the planes normal to the axis of the assembly is constant over the length of the latter, so that the axial power distribution pattern is conveniently flattened.

The fuel assembly of the third embodiment shows an advantageous characteristic over the embodiments 1 and 2 that the deterioration of the reactivity attributable to the exposure takes place at almost an equal rate at both of the upper and the lower regions.

In this case, the boundary between the upper and the lower regions is preferably located at a height ⅓ to 7/12 of the whole assembly height as measured from the bottom.

From the foregoing description, it will be seen that the axial power distribution over the length is made flat, in the fuel assembly of the invention, without the aid of specific shallow rods and/or specific distribution pattern of gadolinea.

Having described the invention in its preferred forms, it is to be noted here that various changes and modifications are possible without substantially departing from the spirit and scope of the invention which is defined solely by the appended claims.

What is claimed is:

1. A fuel assembly for boiling-water reactors comprising a plurality of fuel rods and arranged in a core of a boiling-water reactor in which coolant flows from the bottom of the core toward the top thereof, wherein said fuel assembly is axially divided substantially into upper and lower regions, said upper region having an enrichment larger than that of the lower region, the enrichment in each of said upper and lower regions being uniformly distributed axially thereof and wherein the boundary between said upper and lower regions is located such that when the fuel assembly is arranged in the core of the boiling-water reactor and the reactor has started its operation, a peak power is produced in each of said upper and lower regions.

2. A fuel assembly as set forth in claim 1, wherein the boundary between said upper and lower regions is located at a height within a range of between ⅓ and 7/12 of the whole height of said fuel assembly as measured from the bottom of the latter.

3. A fuel assembly as set forth in claim 1, wherein the fuel rods located in the central portion of a plane normal to the axis of the fuel assembly have an enrichment greater than that of the fuel rods located in the peripheral portion thereof, wherein the enrichment of each of the sections of the fuel rods corresponding to the upper and lower regions of the fuel assembly is uniformly distributed axially thereof, and wherein said upper region has a mean enrichment greater than that of said lower region.

4. A fuel assembly as set forth in claim 2, wherein the fuel rods located in the central portion of a plane normal to the axis of the fuel assembly have an enrichment greater than that of the fuel rods located in the peripheral portion thereof, wherein the enrichment of each of the sections of the fuel rods corresponding to the upper and lower regions of the fuel assembly is uniformly distributed axially thereof, and wherein said upper region has a mean enrichment greater than that of said lower region.

5. A fuel assembly as set forth in claim 2, wherein said fuel assembly comprises fuel rods having a uniform enrichment through the upper and lower regions, and fuel rods have an enrichment at said upper region which is greater than the enrichment at said lower region.

6. A fuel assembly as set forth in claim 3, wherein said fuel assembly comprises fuel rods having a uniform enrichment throughout the upper and lower regions, and fuel rods having an enrichment at said upper region which is greater than the enrichment at said lower region.

7. A fuel assembly as set forth in claim 4, wherein said fuel assembly comprises fuel rods having a uniform enrichment throughout the upper and lower regions, and fuel rods having an enrichment at said upper region which is greater than the enrichment at said lower region.

8. A fuel assembly as set forth in claim 1, wherein said fuel assembly contains gadolinium having a concentration greater in said lower region than in said upper region.

9. A fuel assembly as set forth in claim 2, wherein said fuel assembly contains gadolinium having a concentration greater in said lower region than in said upper region.

10. A fuel assembly consisting of a number of fuel rods characterized in that said fuel assembly is axially divided into an upper and a lower regions, said upper region having an infinite multiplication factor larger than that of the lower region, due to a predetermined enrichment distribution, wherein said upper region has a mean enrichment larger than that of said lower region, wherein the upper end of said lower region is located at a height within a range of between ⅓ and 7/12 of the entire height of said fuel assembly as measured from the bottom of the latter, and wherein the difference of the enrichments between the central and peripheral portions of a plane normal to the axis of the assembly is smaller at said upper region than at said lower region.

11. A fuel assembly consisting of a number of fuel rods characterized in that said fuel assembly is axially divided into an upper and a lower regions, said upper region having an infinite multiplication factor larger than that of the lower region, due to a predetermined enrichment distribution, wherein the upper end of said lower region is located at a height within a range of between ⅓ and 7/12 of the entire height of said fuel assembly as measured from the bottom of the latter, wherein said upper region has a mean enrichment substantially equal to that of said lower region, and wherein the difference of the enrichment between the central and peripheral portions of a plane normal to the axis of the assembly is smaller at said upper region that at said lower region.

12. A fuel assembly as claimed in claim 10, characterized by containing a burnable poison the density of which is thicker at said lower region than at said upper region.

13. A fuel assembly as claimed in claim 11, characterized by containing a burnable poison the density of which is thicker at said lower region than at said upper region.

14. A fuel assembly for boiling-water reactors, comprising a plurality of fuel rods and arranged in a core of a boiling-water reactor, in which coolant flows from the bottom of the core toward the top thereof, wherein said fuel assembly is axially divided substantially into upper and lower regions, the upper and lower regions having differenct infinite multiplication factors due to a mean enrichment distribution which is at least as large in the upper region as in the lower region, and wherein said fuel assembly has a difference in enrichment between central and peripheral portions of a plane normal to the axis of said fuel assembly which is smaller at the upper region of said fuel assembly than at the lower region thereof.

15. A fuel assembly as set forth in claim 14, wherein said central portion of said plane has an enrichment greater than that of the peripheral portion thereof both at said upper and lower regions.

16. A fuel assembly as set forth in claim 14, wherein the boundary between said upper and lower regions is located at a height within a range of between ⅓ and 7/12 of the whole height of said fuel assembly as measured from the bottom of the latter.

17. A fuel assembly as set forth in claim 15, wherein the boundary between said upper and lower regions is located at a height within a range of between ⅓ and 7/12 of the whole height of said fuel assembly as measured from the bottom of the latter.

18. A fuel assembly as set forth in claim 17, wherein said upper region has a mean enrichment greater than that of said lower region.

19. A fuel assembly as set forth in claim 14, wherein said upper region has a mean enrichment greater than that of said lower region.

20. A fuel assembly as set forth in claim 14, wherein said upper region has a mean enrichment substantially equal to that of said lower region.

21. A fuel assembly as set forth in claim 15, wherein said upper and lower regions each have an enrichment uniformly distributed axially thereof.

22. A fuel assembly as set forth in claim 21, wherein the boundary between said upper and lower regions is located at a height within a range of between ⅓ and 7/12 of the whole height of said fuel assembly as measured from the bottom of the latter.

23. A fuel assembly as set forth in claim 21, wherein said upper region has a mean enrichment greater than that of said lower region.

24. A fuel assembly as set forth in claim 21, where said upper region has a mean enrichment substantially equal to that of said lower region.

25. A fuel assembly as set forth in claim 23, wherein said fuel assembly comprises fuel rods having a uniform enrichment throughout the upper and lower regions, and fuel rods having an enrichment at said upper region which is greater than the enrichment at said lower region.

26. A fuel assembly as set forth in claim 22, wherein said fuel assembly comprises fuel rods having a uniform enrichment throughout the upper and lower regions, and fuel rods having an enrichment at said upper region which is greater than the enrichment at said lower region.

27. A fuel assembly for boiling water reactors comprising a plurality of fuel rods, wherein said fuel assembly is acially divided into upper and lower regions for maintaining said upper region with an infinite multiplication factor larger than that of the lower region due to a predetermined enrichment distribution, the upper end of said lower region being located at a height within a range of between ⅓ and 7/12 of the whole height of said fuel assembly as measured from the bottom of the latter, said upper region having a means enrichment larger than that of said lower region, and the difference of enrichment between the central and peripheral portions of a cross-sectional plane normal to the axis of the assembly being smaller at said upper region than said lower region.

28. A fuel assembly for boiling-water reactors as claimed in claim 27, werein a burnable poison having a density which is thicker at said lower region than at said upper region is contained in said fuel assembly.

29. A fuel assembly for boiling-water reactors comprising a plurality of fuel rods wherein said fuel assembly is axially divided into upper and lower regions for maintaining said upper region with an infinite multiplication factor larger than that of the lower region due to a predetermined enrichment distribution, the upper end of said lower region being located at a height within a range of between ⅓ and 7/12 of the whole height of said fuel assembly as measured from the bottom of the latter, said upper region having a mean enrichment substantially equal to that of said lower region, and wherein the difference of enrichment between the central and peripheral portions of a cross-sectional plane normal to the axis of the assembly is smaller at said upper region than at said lower region.

30. A fuel assembly for boiling-water reactors as claimed in claim 29, wherein a burnable poison having a density which is thicker at said lower region than at said upper region is contained in said fuel assembly.

31. A fuel assembly for boiling-water reactors comprising a plurality of fuel rods, wherein said fuel assembly is axially divided into upper and lower regions for maintaining said upper region with an infinite multiplication factor larger than that of the lower region due to a predetermined enrichment distribution, the upper end of said lower region being located at a height within a range of between ⅓ and 7/12 of the whole height of said fuel assembly as measured from the bottom of the latter, and wherein a burnable poison having a density thicker at the lower region than at the upper region is contained in said fuel assembly.

* * * * *